(12) United States Patent
Frait et al.

(10) Patent No.: US 9,206,895 B2
(45) Date of Patent: Dec. 8, 2015

(54) AUXILIARY OIL PUMP INTEGRATED WITH A VEHICLE TRANSMISSION

(75) Inventors: Steven A. Frait, Milan, MI (US); Laurence A. Deutsch, Farmington Hills, MI (US); Senthil Prabhu, Chennai (IN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1148 days.

(21) Appl. No.: 12/838,574

(22) Filed: Jul. 19, 2010

(65) Prior Publication Data

US 2012/0011961 A1  Jan. 19, 2012

(51) Int. Cl.
- F16H 57/02 (2012.01)
- F04B 17/03 (2006.01)
- F16H 61/00 (2006.01)

(52) U.S. Cl.
CPC ........ *F16H 61/0009* (2013.01); *F16H 61/0021* (2013.01); *F16H 2061/0046* (2013.01); *Y10T 74/2186* (2015.01)

(58) Field of Classification Search
USPC ................ 184/6.28, 26, 27.1, 31; 123/196 R
See application file for complete search history.

(56) References Cited

U.S. PATENT DOCUMENTS

| | | | |
|---|---|---|---|
| 5,513,732 A | 5/1996 | Goates | |
| 6,390,947 B1 | 5/2002 | Aoki et al. | |
| 6,647,326 B2 | 11/2003 | Nakamori et al. | |
| 6,688,433 B1 * | 2/2004 | Hauser et al. | 184/6.24 |
| 6,805,647 B2 | 10/2004 | Silveri et al. | |
| 7,232,402 B2 | 6/2007 | Tryon et al. | |
| 7,240,656 B2 * | 7/2007 | Yamane et al. | 123/196 R |
| 7,516,807 B2 * | 4/2009 | Carlson | 180/165 |
| 7,695,250 B2 * | 4/2010 | Johnson et al. | 417/2 |
| 2007/0098567 A1 * | 5/2007 | Johnson et al. | 417/199.1 |
| 2009/0057062 A1 * | 3/2009 | Eschenbeck | 184/6.28 |
| 2009/0257887 A1 | 10/2009 | Beattie, Jr. | |

* cited by examiner

*Primary Examiner* — William E Dondero
*Assistant Examiner* — Mark K Buse
(74) *Attorney, Agent, or Firm* — James Dottavio; MacMillan, Sobanski & Todd, LLC

(57) ABSTRACT

An assembly for an automotive vehicle transmission includes a case containing a fluid sump and valve body, a pump supported on the case, a passage formed in the case for carrying fluid from the pump to a transmission control element, and a second passage formed in the case for carrying fluid from the oil sump to the pump.

20 Claims, 3 Drawing Sheets

AUXILIARY OIL PUMP INTEGRATED WITH A VEHICLE TRANSMISSION

BACKGROUND OF THE INVENTION

1. Field of the Invention

This invention relates generally to an automatic transmission for motor vehicle, and, more particularly, to integrating an auxiliary oil pump, electric drive system and the hydraulic control and supply circuit of the transmission.

2. Description of the Prior Art

An electrical starting motor is used to crank and start an engine in an automotive vehicle equipped with an automatic transmission. To improve vehicle fuel economy, a stop-start engine cranking system automatically turns the engine off when the accelerator pedal is released, the brake pedal is depressed and the vehicle speed is substantially zero for a predetermined period, provided the state of charge of a battery that powers the starting motor is sufficiently high. The engine cranking system automatically restarts the engine in response to the vehicle operator's releasing the brake pedal and depressing the accelerator pedal, indicating a desire to accelerate the vehicle. These actions occur without need to turn the ignition key either on or off.

To avoid producing an engine speed flare upon restarting the engine, the transmission control elements, i.e., the friction clutches and brakes that produce drive in the startup gear, are stroked to take up clearances in the servos that actuate the control elements, and a low magnitude of torque transmitting capacity is produced in those friction elements, thereby reinstating the vehicle creep function whereby the vehicle moves in gear at low speed.

Automatic transmission fluid at line pressure is supplied to the friction elements for this purpose. An auxiliary oil pump driven by an electric motor and powered by an electric storage battery is provided to maintain pressure in the friction elements The auxiliary pump must be able to draw oil from the transmission's oil sump and supply flow to the hydraulic control's valve body. Adding the electric motor and oil pump to an automatic transmission to support the stop/start function usually requires significant changes to the transmission. Usually the valve body, transmission case, converter housing and sometimes, even the base mechanical pump are modified to achieve the engine start/stop function.

A need exists in the industry for a technique or system that readily and reliably connects an auxiliary oil pump to a transmission oil sump and to a passage that carries pressurized fluid to friction elements of the transmission.

SUMMARY OF THE INVENTION

An assembly for an automotive vehicle transmission includes a case containing a fluid sump and valve body, a pump supported on the case, a passage formed in the case for carrying fluid from the pump to valve body and a second passage formed in the case for carrying fluid from the oil sump to the pump.

The assembly is arranged such that the elevation of the pump is lower than an elevation of fluid in the sump, thereby maintaining the pump primed and minimizing the inlet suction head.

The assembly permits direct access to the line pressure circuit from the pump outlet. The pump is located such that the lengths of the passages to the suction inlet of the pump and between the pump and to the line pressure circuit are short and have a common port position.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
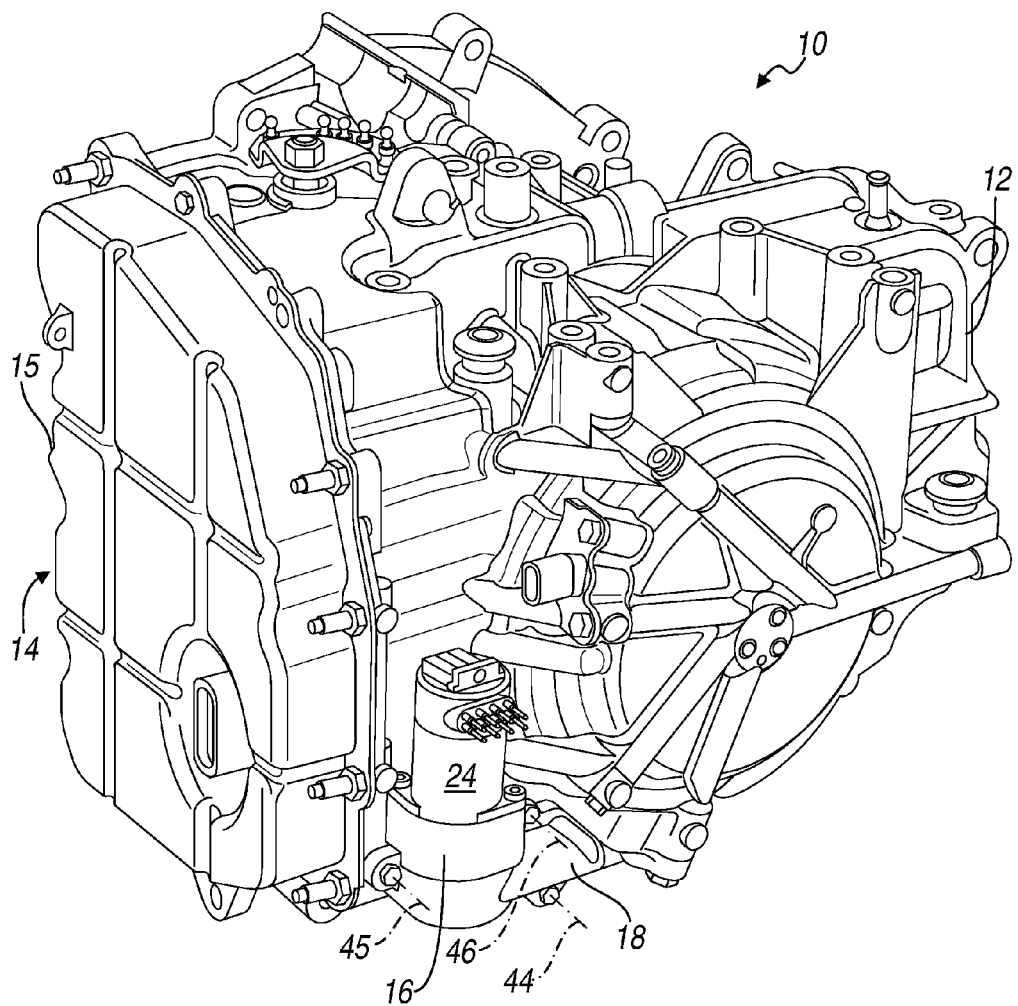
FIG. 1 is a perspective view of a transaxle case showing an auxiliary pump supported in the case near the oil sump.
Figure 2:
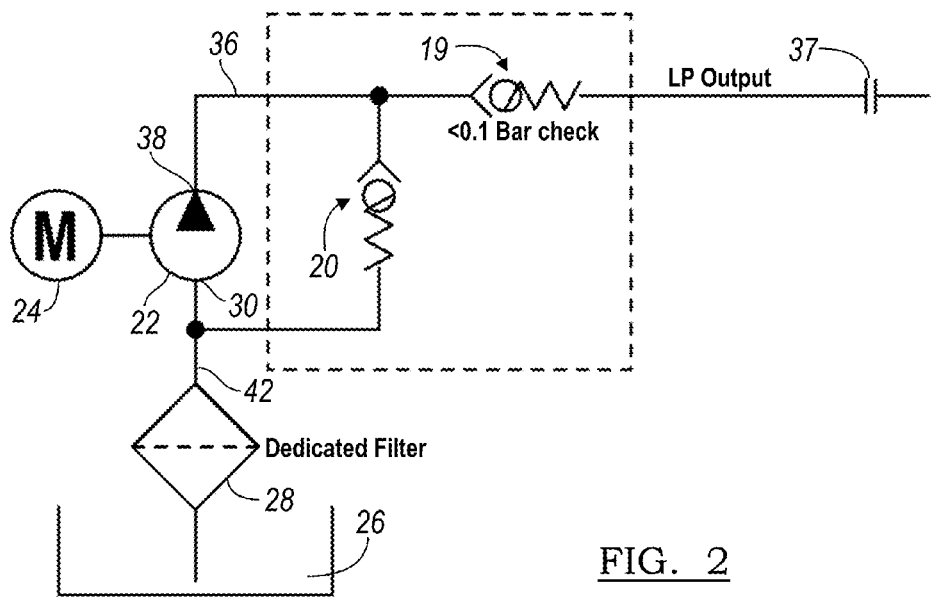
FIG. 2 is schematic diagram of a hydraulic circuit that carries transmission fluid from the sump through the pump to an exit passage.

Referring now to the drawings, there is illustrated in FIGS. 1 and 2 a transaxle assembly 10, case 12 enclosing a torque converter, gearing and hydraulically actuated clutches and brakes, which control the gearing. A valve body 14 comprising hydraulic valves, solenoids and passages interconnecting the components is enclosed in case 12, and covered by a cover 15, secured to a front surface of the case 12.

An auxiliary oil pump assembly 16 is mounted on the upper surface of a manifold 18, which contains a check valve 19 and pressure relief valve 20. The manifold 18 and pump assembly 16 are mounted at a low elevation on the transaxle case 12 and external to the case 12 and at substantially the same elevation as oil sump 26. Preferably the pump 22 of the pump assembly 16 is a G-rotor pump, although a vane pump or another suitable pump type can be used.

Pump 22 is driven by an electric motor 24, preferably a brushless DC motor, which is powered by an electric storage battery.

The transaxle case 12 contains an oil sump 26, from which automatic transmission fluid is drawn through a filter 28 to the inlet 30 of pump 22.

Figure 3:
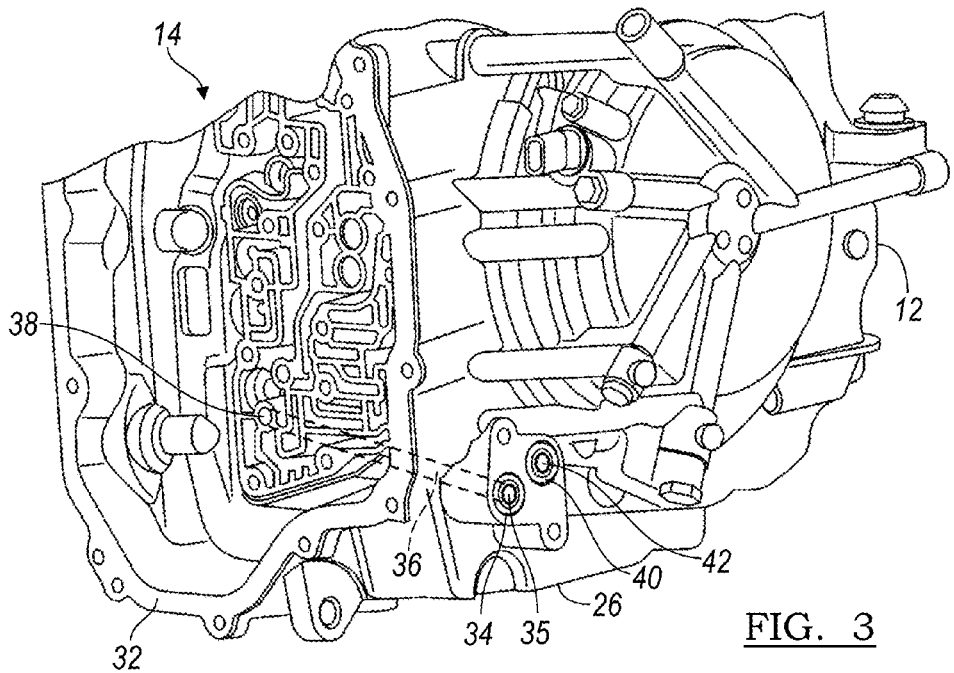
FIG. 3 is a perspective view of the transaxle case with the manifold removed from transaxle case exposing fluid passage openings.

FIG. 3 shows the transaxle case 12 with the valve body cover 14 removed and exposing the surface 32, on which the valve body cover 14 is secured to the case 12. An O-ring 34 is seated at an opening 35 formed in case 12 where a first, circular cylindrical fluid passage 36 carries fluid to a source 37 of fluid at line pressure in the valve body. Passage 36 maybe inclined at about 15 degrees with respect to a horizontal plane, extends from the valve body through a wall of the transaxle case 12 to opening 35, and has a diameter of about 6.35 mm. Valve body 14 directs fluid exiting passage 36 to at least one control element 37, i.e., a friction clutch or brake whose engagement produces drive at the vehicle wheels in the startup gear of the transaxle.

Another O-ring 40 is seated at an opening in case 12 where a second fluid passage 42 carries fluid from sump 26 to the pump inlet 30. Passage 42 is substantially horizontal, extends through a wall of the transaxle case 12 to the pump inlet 30, and has a diameter of about 11 mm.

In FIG. 3 the manifold 18 is removed from the case 12 in order to reveal the O-rings 34, 40 and passages 36, 42. Attachment bolts, centered at 44, 45, 46, secure the manifold 18 to the case 12 by engaging tapped holes formed in the end face of the case 12.

Figure 4:
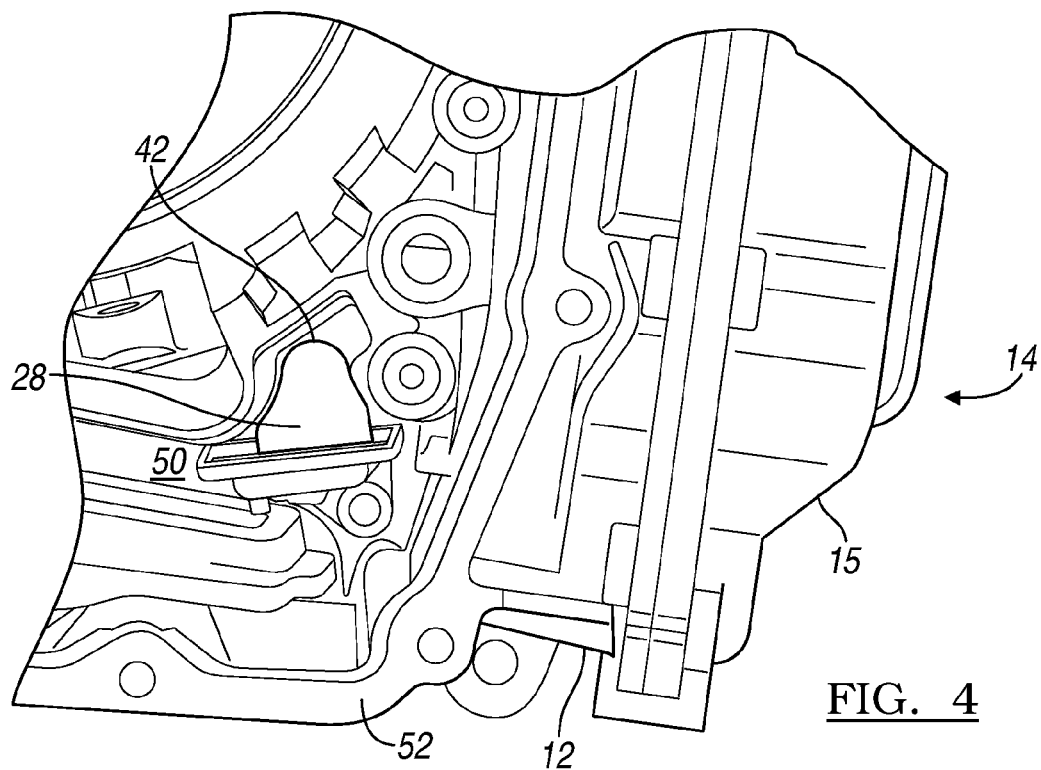
FIG. 4 is a perspective view of a rear wall of the transaxle case of FIG. 1 showing a fluid filter.
Figure 5:
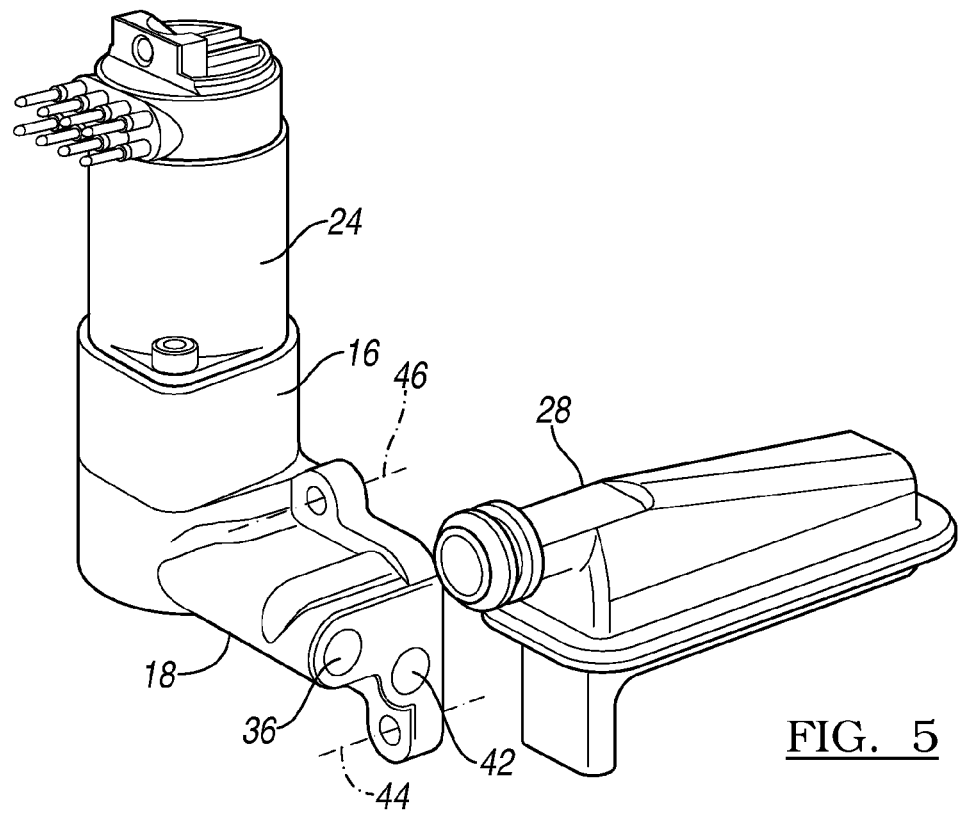
FIG. 5 is a perspective view showing the pump, motor, manifold and filter.

FIG. 4 shows filter 28 supported on the back wall 50 of case 12 for filtering contaminants in transmission fluid traveling from sump 26 to the pump inlet 30. Mounting flange 52 supports a torque converter housing on the transmission case 12. FIG. 5 shows the pump 16, motor 24, manifold 18 and filter 28 arranged in their respective positions when installed on the case 12.

The pump assembly 16 is located at a low elevation outside of the transmission case 12 such that the O-ring 40 at the opening of suction feed passage 42 is located at the elevation of the transmission sump 26. This allows for direct access to the sump 26, where the stand-alone filter 28 is positioned. This location also provides direct access via a gun drill to the line pressure passage 36 in the valve body 14, thereby facilitating installation of the auxiliary pump 16 and requiring only modifications to the transmission case 12.

In accordance with the provisions of the patent statutes, the preferred embodiment has been described. However, it should be noted that the alternate embodiments can be practiced otherwise than as specifically illustrated and described.

The invention claimed is:

1. An assembly for an automotive vehicle transmission, comprising:
   a case containing a fluid sump and valve body;
   a pump supported on the case and located external to the case;
   a passage formed in the case for carrying fluid from the valve body to a transmission control element;
   a second passage formed in the case for carrying fluid from the oil sump to the pump.

2. The assembly of claim 1, wherein the passages extend at least partially through a wall of the case.

3. The assembly of claim 1, wherein the entire pump is located outside the case.

4. The assembly of claim 1, wherein the passage carries fluid at least partially along a fluid path to a line pressure source in the valve body.

5. The assembly of claim 1, wherein the second passage carries fluid at least partially along a fluid path from the sump to an inlet of the pump.

6. The assembly of claim 1, further comprising:
   an electric motor driveably connected to the pump; and
   a manifold supported on the case external to the case, the pump supported on the manifold, the manifold directing fluid carried in the passage to the control element, and directing fluid carried in the second passage to the pump inlet.

7. The assembly of claim 1, further comprising:
   a filter supported on a wall of the case external to the case and located in a fluid path between the sump and an inlet of the pump.

8. An assembly for an automotive vehicle transmission, comprising:
   a sump;
   a case containing a fluid source;
   a pump supported on and located external to the case;
   first and second passages formed at least partially in the case, the first passage for carrying fluid from the fluid source, the second passage located at an elevation substantially equal to an elevation of the sump for carrying fluid from the sump to the pump.

9. The assembly of claim 8, wherein the fluid source is pressurized.

10. The assembly of claim 8, wherein each passage extends at least partially through a wall of the case.

11. The assembly of claim 8, wherein the first passage extends at least partially along a fluid path connecting an outlet of the pump and a valve body.

12. The assembly of claim 11, further comprising:
   a filter secured in a second wall of the transmission and located external to the transmission, communicating with an inlet of the pump and communicating through the second passage with the sump.

13. The assembly of claim 8, wherein the second passage carries fluid at least partially along a fluid path from the sump to an inlet of the pump.

14. The assembly of claim 8, further comprising:
   an electric motor driveably connected to the pump; and
   a manifold supported on and external to the case, the pump supported on the manifold, the manifold directing fluid carried in the first passage to the control element, and directing fluid carried in the second passage to an inlet of the pump.

15. An assembly for an automotive vehicle transmission, comprising:
   a sump;
   a fluid source;
   a pump and a motor located external to a case;
   first and second passages in the case, the first passage communicating with the fluid source, the second passage located at an elevation substantially equal to an elevation of the sump and communicating with the sump and the pump.

16. The assembly of claim 15, wherein:
   the motor is an electric motor driveably connected to the pump; and
   further comprising a manifold located external to the case, and hydraulically connecting the first passage with a transmission control element.

17. The assembly of claim 15, further comprising:
   a filter supported on a wall of the case external to the case and located in a fluid path between the sump and an inlet of the pump.

18. The assembly of claim 15, wherein the first passage extends at least partially along a fluid path connecting the fluid source and a control element of the transmission.

19. The assembly of claim 15, wherein the second passage carries fluid at least partially along a fluid path from the sump to an inlet of the pump.

20. The assembly of claim 15, wherein the fluid source is located in the case and is pressurized.

* * * * *